(12) United States Patent
Boese et al.

(10) Patent No.: US 7,604,402 B2
(45) Date of Patent: Oct. 20, 2009

(54) MEASURING DEVICE FOR MEASURING THE TEMPERATURE OF A THERMALLY LOADED METALLIC BASE ELEMENT, PROVIDED WITH A PROTECTIVE SURFACE COATING, AND METHOD FOR PRODUCING SUCH A MEASURING DEVICE

(75) Inventors: Matthias Thomas Boese, Waldshut-Tiengen (DE); Thomas Duda, Wettingen (CH)

(73) Assignee: Alstom Technology Ltd, Baden (CH)

( * ) Notice: Subject to any disclaimer, the term of this patent is extended or adjusted under 35 U.S.C. 154(b) by 88 days.

(21) Appl. No.: 11/687,784

(22) Filed: Mar. 19, 2007

(65) Prior Publication Data

US 2007/0223560 A1 Sep. 27, 2007

(30) Foreign Application Priority Data

Mar. 20, 2006 (CH) .................................. 00428/06

(51) Int. Cl.
*G01K 7/00* (2006.01)

(52) U.S. Cl. ..................... 374/179; 374/141; 374/208; 136/233

(58) Field of Classification Search ................. 374/179, 374/208, 141; 136/233
See application file for complete search history.

(56) References Cited

U.S. PATENT DOCUMENTS

| 3,592,061 | A |   | 7/1971 | Schwedland et al. |
| 5,507,623 | A | * | 4/1996 | Kojima et al. ........... 416/241 R |
| 6,838,157 | B2 |   | 1/2005 | Subramanian |
| 2004/0114666 | A1 | * | 6/2004 | Hardwicke et al. .......... 374/179 |
| 2004/0202886 | A1 |   | 10/2004 | Subramanian |
| 2005/0061058 | A1 |   | 3/2005 | Willsch et al. |
| 2005/0198967 | A1 |   | 9/2005 | Subramanian |

* cited by examiner

*Primary Examiner*—Gail Verbitsky
*Assistant Examiner*—Mirellys Jagan
(74) *Attorney, Agent, or Firm*—Darby & Darby

(57) ABSTRACT

A measuring device for measuring the temperature of a thermally loaded metallic base element, especially a gas turbine component, provided with a protective surface coating includes a sensor integrated in the base element. The sensor is arranged in a recess introduced into the base element from the outside. The protective surface coating is formed continuously over the sensor disposed in the recess.

16 Claims, 3 Drawing Sheets b)

c)

d)

MEASURING DEVICE FOR MEASURING THE TEMPERATURE OF A THERMALLY LOADED METALLIC BASE ELEMENT, PROVIDED WITH A PROTECTIVE SURFACE COATING, AND METHOD FOR PRODUCING SUCH A MEASURING DEVICE

Priority is claimed to Swiss Patent Application No. CH 00428/06, filed on Mar. 20, 2006, the entire disclosure of which is incorporated by reference herein.

The present invention relates to the field of thermal machines. It concerns a measuring device for measuring the temperature of a thermally loaded metallic base element, provided with a protective surface coating, according to the precharacterizing clause of claim 1 and a method for producing such a measuring device.

BACKGROUND

Such a measuring device is known for example from the printed document U.S. Pat. No. B2-6,838,157.

The use of integrated thermocouples for temperature measurement on gas turbine blades without a surface coating has long been known (see for example U.S. Pat. No. 3,592,061).

The blades in the first stages of modern gas turbines, which are exposed to increasingly higher hot-gas temperatures to increase efficiency, are provided on the surface with a special protective surface coating (heat insulating layer or Thermal Barrier Coating TBC), which is intended to protect the underlying metal of the base element from excessively high temperatures. For normal operation (base load), the influence of the thermal barrier coating in the heat transfer models is well understood. In the part-load range, however, the effect of the thermal barrier coating decreases, since the boundary conditions for heat transfer change. Together with the lower pressures in the cooling air supply in the case of part-load, this can lead to a restriction of the service life of the blading.

The existing instrumentation with thermocouples relates to blades without a thermal barrier coating, in order to eliminate the influence of the thickness and the thermal conductivity of the thermal barrier coating in the validation of the cooling in base-load operation. In order to permit validation also in part-load operation, technology with which temperature measurement under the thermal barrier coating can be realized (by means of thermocouples) is necessary.

In the document mentioned at the beginning, it has already been proposed to arrange temperature sensors "buried" in gas turbine components provided with thermal barrier coatings (see for example the sensor 78 in FIG. 2 of U.S. Pat. No. B2-6,838,157), in that a trench is first made in the ready-coated component, the trench is then lined with an insulation, a conducting layer is subsequently deposited on the bottom of the trench, an insulating layer is applied thereover, and finally the trench is filled again to the surface of the thermal barrier coating (FIG. 3).

SUMMARY OF THE INVENTION

This known type of buried temperature sensor has various disadvantages:
It is not suitable for thermocouples.
When the trenches are created, the thermal barrier coating and the bond coat lying thereunder are locally broken through and are also not completely restored. This produces weak points, which impair the heat resistance and service life of the component.

A comparatively great effort is required to make the trench penetrate through the surface coating to the metallic base element.

It is an object of the invention to provide a temperature measuring device for thermally loaded components of gas turbines or the like that are provided with a thermal barrier coating which avoids one or more of the disadvantages of known forms of instrumentation and is distinguished by suitability for the use of thermocouples, simplified construction and installation, and improved long-term properties, and also to provide a method for its production.

The arrangement according to the invention, in which the sensor is preferably a thermocouple, is characterized in particular in that the protective surface coating is formed continuously over the sensor located in the recess.

A refinement of the invention is distinguished by the fact that the thermocouple in the recess is embedded in braze or modified wettable powder, and in that the braze or modified wettable powder fills the recess in such a way that the base element has a continuously planar surface in the region of the recess. This produces a uniform base for the surface coating lying thereover.

Another refinement of the invention is characterized in that the protective surface coating comprises a metallic bond coat, preferably of MCrAlY, and in that the metallic bond coat is formed continuously over the sensor located in the recess. In particular, the metallic bond coat has a uniform thickness over the sensor located in the recess.

According to a further refinement, the metallic bond coat comprises two partial layers lying one on top of the other, only the upper partial layer having a uniform thickness over the sensor located in the recess.

The protective surface coating also preferably comprises a ceramic thermal barrier coating, which is arranged over the metallic bond coat and is formed continuously over the sensor located in the recess.

A refinement of the one method according to the invention is characterized in that the recess is filled with braze or modified wettable powder, in that first a metallic bond coat, preferably of MCrAlY, and then a ceramic thermal barrier coating are applied as the protective surface coating. The metallic bond coat may in this case be applied in two partial layers one after the other.

The metallic bond coat is preferably applied by means of atmospheric plasma spraying (APS) or low-vacuum plasma spraying (LVPS) or high-velocity oxyfuel spraying (HVOF), and the ceramic thermal barrier coating is applied by means of thermal spraying or electron-beam physical vapor deposition (EB-PVD).

A refinement of the other method according to the invention is characterized in that the recess is filled with braze or modified wettable powder, and in that first a second metallic partial layer, preferably of MCrAlY, and then a ceramic thermal barrier coating are applied as the protective surface coating.

The second metallic bond coat is preferably applied by means of atmospheric plasma spraying (APS) or low-vacuum plasma spraying (LVPS) or high-velocity oxyfuel spraying (HVOF), and the ceramic thermal barrier coating is preferably applied by means of thermal spraying or electron-beam physical vapor deposition (EB-PVD).

BRIEF DESCRIPTION OF THE DRAWINGS

The invention is to be explained in more detail below on the basis of exemplary embodiments in conjunction with the drawings, in which.

DETAILED DESCRIPTION OF THE PREFERRED EMBODIMENTS

Figure 1:
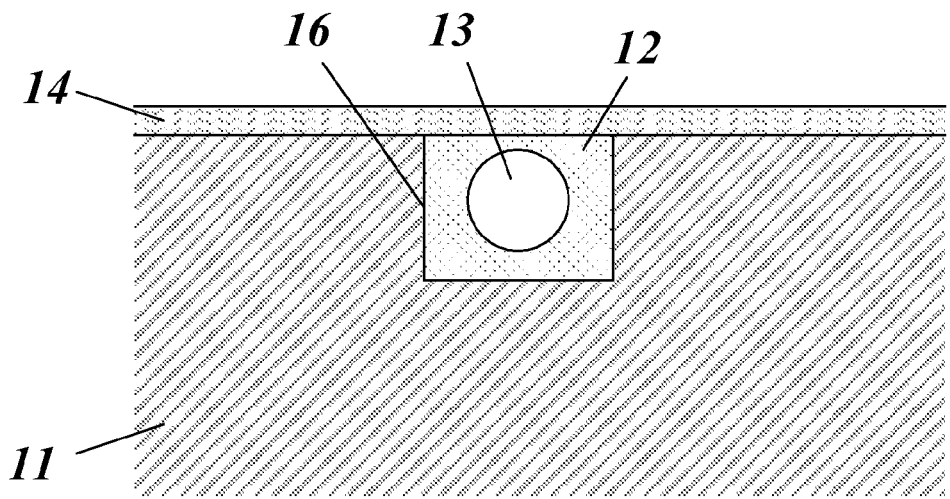
FIG. 1 shows a first exemplary embodiment of a measuring device according to the present invention in section.
Figure 4:
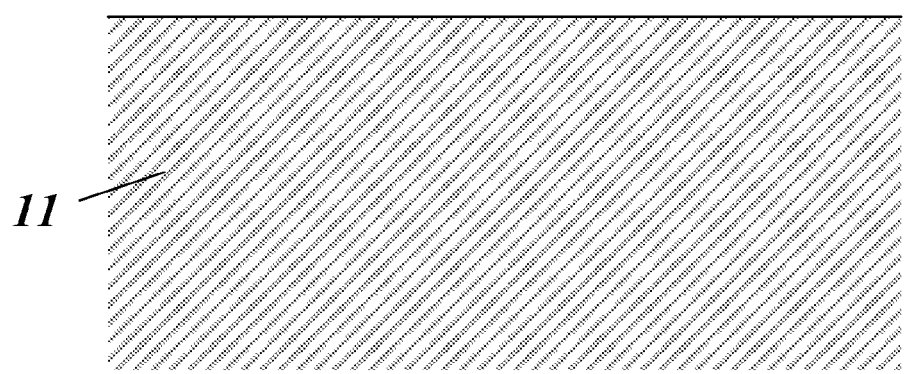
FIG. 4 shows various steps in the production of a measuring device as shown in FIG. 1 in several part-FIGS. 4(a) to 4(d).
Figure 4:
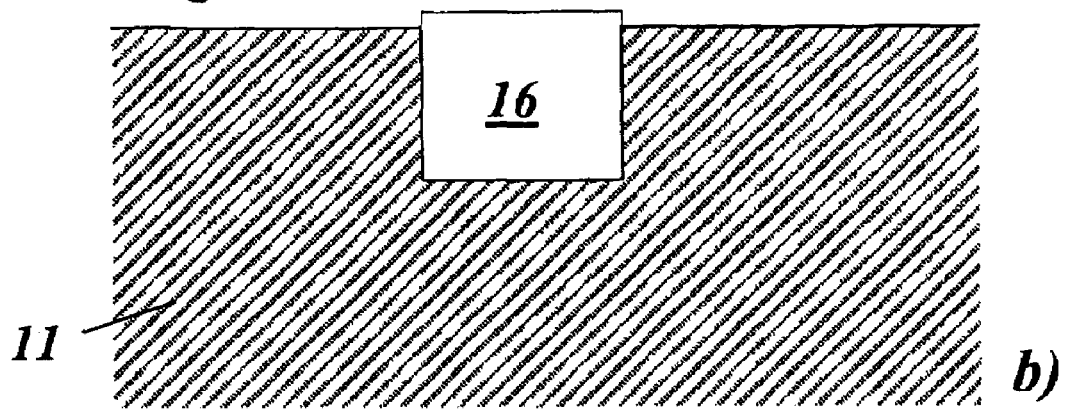
Figure 4:
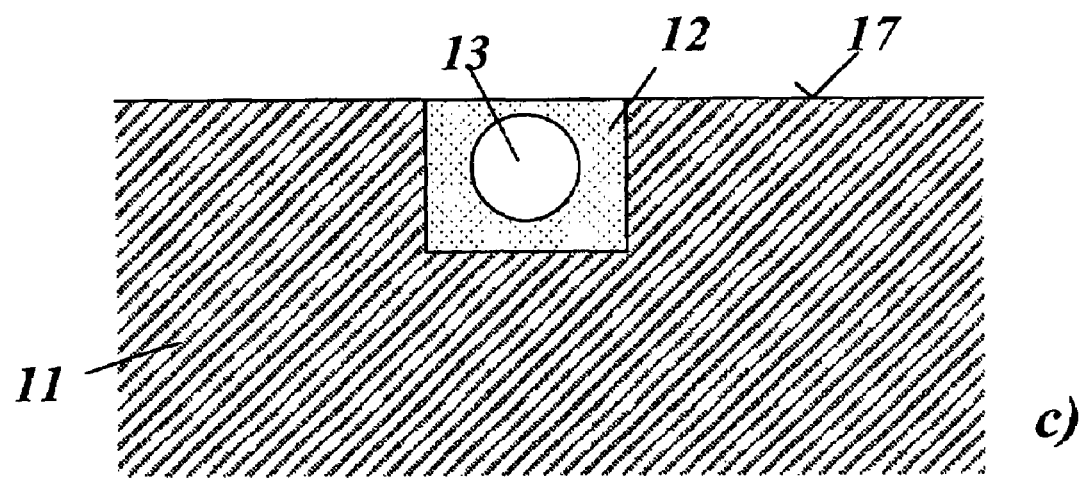
Figure 4:
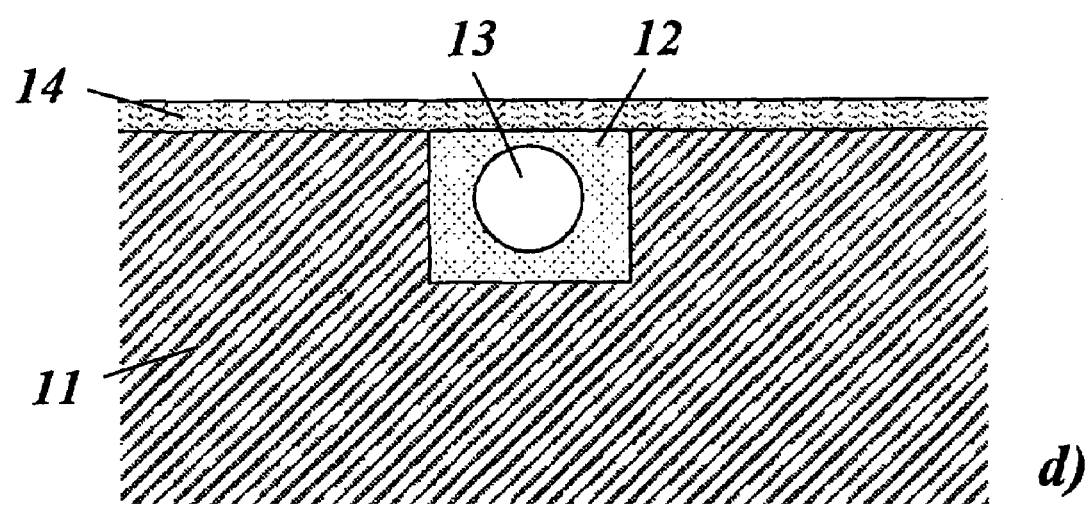

In FIG. 1, a first exemplary embodiment of a measuring device according to the invention is reproduced in section. The measuring device 10 is integrated in a metallic base element 11, a detail of which is represented in the figure, and which may for example be the blade of a gas turbine. Set into the base element 11 from the outer surface is a recess 16, which is adapted in depth and cross section to the sensor to be received, especially a thermocouple. Located in the recess 16 as the temperature sensor is a thermocouple 13, which is surrounded on all sides by braze or modified wettable powder 12. The braze or modified wettable powder 12 has the effect that the thermocouple 13 is thermally coupled closely to the base element 11 and at the same time fixed in the recess 16. The braze or modified wettable powder 12 fills the recess 16 in such a way that the base element 11 has a continuously planar surface (17 FIG. 4c) in the region of the recess 16. The planar surface of the base element is covered by a continuous metallic bond coat 14, which preferably has the composition MCrAlY (M=Fe, Co or Ni). This bond coat 14 is suitable for imparting to a ceramic thermal barrier coating lying thereover the necessary bonding strength on the surface of the base element 11.

The production of such a measuring device 10 is performed in several steps according to FIGS. 4a-d. This starts with the uncoated base element 11 (FIG. 4a), into which a recess 16 is introduced (FIG. 4b) from the surface (from the outside). The sensor or the thermocouple 13 is introduced into the recess 16. The recess 16 with the sensor 13 located in it is then filled (with braze or modified wettable powder 12) in such a way that the base element 11 has a continuous surface 17 in the region of the recess 16 (FIG. 4c). Finally, the metallic bond coat 14 is applied to the base element 11 in such a way that the region with the sensor 13 is covered (FIG. 4d). The metallic bond coat 14 is in this case preferably applied by means of atmospheric plasma spraying (APS) or low-vacuum plasma spraying (LVPS) or high-velocity oxyfuel spraying (HVOF).

Figure 2:
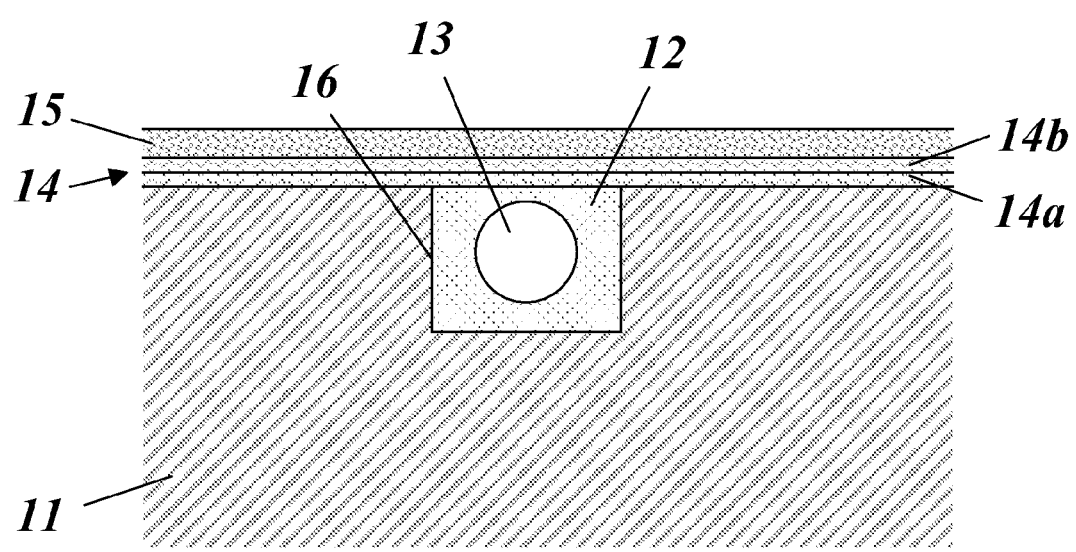
FIG. 2 shows a second exemplary embodiment of a measuring device according to the present invention in section.

A further exemplary embodiment of the measuring device according to the invention is reproduced in FIG. 2. The base element 11, the recess 16, its filling with braze or modified wettable powder 12, and the thermocouple 13 of the measuring device 20 are the same as in FIG. 1. As a difference from FIG. 1, however, here a ceramic thermal barrier coating 15 is applied over the metallic bond coat 14 as a further layer. In order to permit improved bonding, the bond coat 14 is subdivided into two partial layers 14a and 14b, lying one on top of the other, the partial layer 14a being made smooth and the partial layer 14b being made rough. The production of this device can be performed in a way analogous to FIG. 4, the application of the thermal barrier coating 15, preferably by means of thermal spraying or electron-beam physical vapor deposition (EB-PVD), being provided downstream as an additional step.

Figure 3:
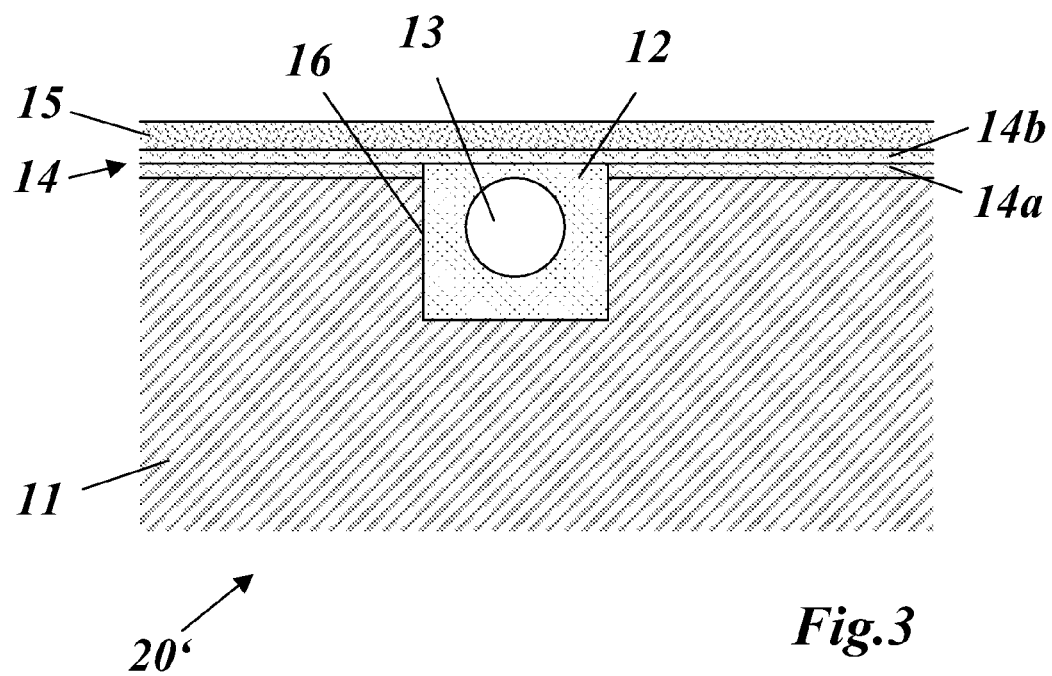
FIG. 3 shows a third exemplary embodiment of a measuring device according to the present invention in section.

A variant of the exemplary embodiment of FIG. 2 is represented in FIG. 3. In the case of this measuring device 20', the partial layer 14a is first applied to the uncoated base element 11, before the recess 16 is then created (through the partial layer 14a). The filling of the recess 16 with braze or modified wettable powder 12 takes place up to the surface of the partial layer 14a. Then, the partial layer 14b is applied, and the thermal barrier coating 15 is applied thereover.

Altogether, the invention provides a measuring device and a method for producing it that are comparatively simple, are suitable for thermocouples, and lead to an improved surface finish of the component. Furthermore, the actual temperature of the metal is sensed and there is no impairment of the service life of the component with respect to oxidation.

What is claimed is:

1. A measuring device for measuring the temperature of a thermally loaded metallic base element having a protective surface coating, the measuring device comprising:
    a sensor integrated in the base element and being disposed in a recess extending into the base element from an outside of the base element, wherein the protective surface coating is formed continuously over both the base element and the recess, wherein the sensor is a thermocouple, wherein the thermocouple is embedded in one of a braze and a modified wettable powder filling the recess such that the base element has a continuously planar surface in the region of the recess, and wherein the braze or modified wettable powder surrounds the thermocouple on all sides so as to thermally couple the thermocouple closely to the base element and to fix the thermocouple in the recess.

2. The measuring device as recited in claim 1, wherein the metallic base element is a gas turbine component.

3. The measuring device as recited in claim 1, wherein the protective surface coating includes a metallic bond coat formed continuously over the sensor located in the recess.

4. The measuring device as recited in claim 3, wherein the metallic bond coat is a MCrAlY coat.

5. The measuring device as recited in claim 3, wherein the metallic bond coat has a uniform thickness in a region over the sensor disposed in the recess.

6. The measuring device as recited in claim 3, wherein the metallic bond coat includes an upper partial layer laying on top of a lower partial layer and wherein only the upper partial layer has a uniform thickness in a region over the sensor disposed in the recess.

7. The measuring device as recited in claim 3, the protective surface coating includes a ceramic thermal barrier coating disposed over the metallic bond coat, and the thermal barrier coating is formed continuously over the sensor located in the recess.

8. A method for producing a measuring device for measuring the temperature of a thermally loaded metallic base element, the method comprising:
    providing a base element having a recess introduced from an outside of the base element;
    introducing a sensor into the recess;
    filling the recess, with the sensor disposed inside it, such that the base element has a continuous outside surface in a region of the recess; and
    applying a protective surface coating to the base element such that the region with the sensor is covered, wherein the protective surface coating is formed continuously over both the base element and the recess, and wherein the filling of the recess includes filling the recess with at least one of a braze and a modified wettable powder such that the braze or modified wettable powder surrounds the sensor on all sides so as to thermally couple the sensor closely to the base element and to fix the sensor in the recess.

9. The method as recited in claim 8, wherein the applying of the protective surface coating includes first applying a metallic bond coat, and then a ceramic thermal barrier coating.

10. The method as recited in claim 9, wherein the metallic bond coat includes a MCrAlY coat.

11. The method as recited in claim 9, wherein the metallic bond coat is applied in two partial layers one after the other.

12. The method as recited in claim 9, wherein the metallic bond coat is applied using one of atmospheric plasma spraying, low-vacuum plasma spraying (LVPS) and high-velocity oxyfuel spraying (HVOF), and wherein the ceramic thermal barrier coating is applied using one of thermal spraying and electron-beam physical vapor deposition (EB-PVD).

13. A method for producing a measuring device for measuring the temperature of a thermally loaded metallic base element, the method comprising:
providing a base element, coated with a first metallic partial layer and having a recess introduced from an outside of the base element;
introducing a sensor into the recess;
filling the recess, with the sensor disposed in it, such that the base element has a continuous surface in a region of the recess;
applying further layers of a protective surface coating to the base element so as to cover the region with the sensor, wherein the filling of the recess includes filling the recess with at least one of a braze and a modified wettable powder such that the braze or modified wettable powder surrounds the sensor on all sides so as to thermally couple the sensor closely to the base element and to fix the sensor in the recess.

14. The method as recited in claim 13, wherein the applying of the protective surface coating includes first applying a second metallic partial layer and then a ceramic thermal barrier coating.

15. The method as recited in claim 14, wherein the second metallic bond coat includes a MCrAlY coat.

16. The method as recited in claim 14, wherein the second metallic bond coat is applied using one of atmospheric plasma spraying, low-vacuum plasma spraying (LVPS) and high-velocity oxyfuel spraying (HVOF), and wherein the ceramic thermal barrier coating is applied using one of thermal spraying and electron-beam physical vapor deposition (EB-PVD).

* * * * *